Dec. 12, 1972 G. GUNZEL 3,706,047

AMPLIFIER CIRCUIT

Filed Jan. 29, 1971

*Inventor:*
Gerhard Günzel

BY *Spencer & Kaye*
ATTORNEYS.

United States Patent Office 3,706,047
Patented Dec. 12, 1972

3,706,047

AMPLIFIER CIRCUIT

Gerhard Gunzel, Heilbronn, Germany, assignor to Licentia Patent-Verwaltungs-G.m.b.H., Frankfurt am Main, Germany Filed Jan. 29, 1971, Ser. No. 110,882
Claims priority, application Germany, Jan. 31, 1970, P 20 04 461.5
Int. Cl. H03f *3/04;* G01b *7/16*
U.S. Cl. 330—24 4 Claims

ABSTRACT OF THE DISCLOSURE

An amplifier circuit comprises a common-emitter connected transistor into the collector path of which is connected a first resistance also connected to a voltage source and a voltage divider for adjusting the base emitter direct voltage and including a series connection of a second resistance and a diode, the second resistance being connected to the voltage source and the diode being connected in parallel with the base-to-emitter path of the transistor and the first and second resistances being semiconductor strain gauges.

BACKGROUND OF THE INVENTION

The invention relates to an amplifier consisting of at least one transistor with a common-emitter-connection, into the collector path of which there is connected a resistance which is connected to the source of supply voltage and of which the base-to-emitter direct voltage is adjusted by means of a voltage divider.

SUMMARY OF THE INVENTION

The object of the present invention is to provide a threshold amplifier or contactless switch controlled by strain gauges which can be simple in construction and can be independent of temperature.

According to the invention, there is provided an amplifier circuit comprising a common-emitter connected transistor, a first resistor connected into the collector path of said transistor and connected to a source of supply voltage and a voltage divider for adjusting the base-emitter direct voltage of said transistor and including a second resistor connected to said source of supply voltage, and a diode connected in series with said second resistor and in parallel with the base-emitter path of said transistor, said first and second resistors consisting of semiconductor strain gauges.

BRIEF DESCRIPTION OF THE DRAWINGS

The invention will now be described in greater detail, by way of example, with reference to the accompanying drawings, in which.

DESCRIPTION OF THE PREFERRED EMBODIMENTS

Basically, in accordance with the invention, in an amplifier comprising at least one transistor with a common-emitter connection, into the collector path of which there is connected a resistor which is connected to the source of supply voltage and of which the base-to-emitter direct voltage is adjusted by means of a voltage divider, it is proposed that the voltage divider should consist of series connection of a resistor and a diode, the diode being connected in the same sense as and in parallel to the base-emitter diode of the transistor, while the resistor is connected to the source of supply voltage, that the two resistors should be so dimensioned that the current through the voltage divider corresponds substantially to the collector current of the transistor, that the resistance values of the resistors should be variable in opposite senses to one another by means of external influence and that the resistors should consist of semiconductor strain gauges.

Semiconductor strain gauges consist, for example, of a thin semiconductor layer of germanium or silicon which is secured to a support. This support is either stretched or upset in the longitudinal or in the transverse direction in relation to the gauge. In this case, the resistance of the semiconductor layer to which the electrodes are connected alters considerably. Other embodiments of semiconductor strain gauges are known which are composed of a plurality of semiconductor layers.

Known threshold amplifiers consist mainly of bridge-voltage or bridge-current amplifiers. The new circuit arrangement is based on the principle of the bridge circuit with the advantage that opposite changes in resistance produce a higher output voltage. In addition, following circuit elements can be coupled up to the amplifier circuit according to the invention with little expense. Variations in resistance in the same sense, which are caused for example by a variation in the temperature conditions, are compensated in the circuit according to the invention and do not lead to a variation in the output voltage.

In the circuit arrangement according to the invention, the two strain gauges are so arranged or coupled to one another that, when an external loading occurs, the one gauge is stressed in its longitudinal direction and the other gauge in its transverse direction. As a result, the resistance values vary in the opposite sense to one another under external loading.

Figure 1:
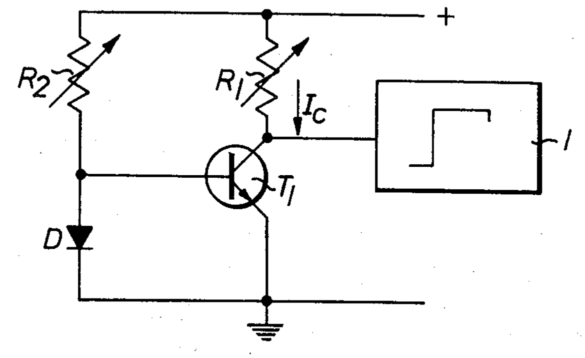
FIG. 1 is a circuit diagram of a simple form of amplifier in accordance with the invention.

Referring now to the drawings, FIG. 1 shows the simplest form of the amplifier according to the invention. Connected into the collector path of a transistor $T_1$ which is operated with a common-emitter connection, is a resistor $R_1$ which is connected to the source of supply voltage. The transistor illustrated in FIG. 1 may be an n-p-n transistor for example, the emitter electrode of which is connected to earth. In the circuit illustrated, the base potential is adjusted by means of a voltage divider consisting of a resistor $R_2$, which is connected to the positive pole of the source of supply voltage, and a diode D. The diode is operated in the forward direction and is connected in parallel with the base-to-emitter diode of the transistor $T_1$. The known diode equation:

$$U_D = U_T \ln (I/I_S + 1) \quad (1)$$

applies for the diode forward current. This diode voltage also appears at the base-to-emitter diode of the transistor $T_1$, for which the corresponding equation:

$$U_{BE} = U_T \ln (I_c/\alpha \cdot I_S + 1) \quad (2)$$

applies. This means that with like characteristics of the diode D and the base-emitter diode of the transistor $T_1$, the diode current is as great as the collector current $I_c$.

$$I = I_c \quad (3)$$

then applies. $U_T$ is the so-called temperature voltage $I_S$ the reverse current of the diode and $\alpha$ the current amplification.

The same characteristic relationships are valid unless the transistor is operated in the overdriven range. The resistors $R_1$ and $R_2$ are preferably selected equal in size, or $R_2$ is selected smaller than $R_1$ in order to obtain as great a variation as possible in the output voltage on a variation in the resistance values in opposite senses.

The resistors $R_1$ and $R_2$ are strain gauges. If the resistance of $R_2$ decreases under external loading, the diode voltage becomes somewhat higher. The consequence is that the base-emitter voltage at the transistor $T_1$ increases and the collector-emitter voltage at the output of the transistor becomes lower. At the same time, the resistance $R_1$ becomes greater under the influence of the external loading. The load line in the characteristic field therefore becomes flatter and the collector-emitter voltage still lower. Thus it is seen that the variations in the resistance values are added in their effect on the output voltage. A variation in $R_1$ and the opposite variation in $R_2$ thus cause a voltage variation at the collector-emitter path of the transistor, or at the resistor $R_1$, which is greater than in a corresponding bridge circuit when the same variations in resistance occur there.

On the other hand, a variation in the resistance values in the same sense, which is caused for example by a variation in the temperature conditions, does not cause any variation in the output voltage.

Figure 2:
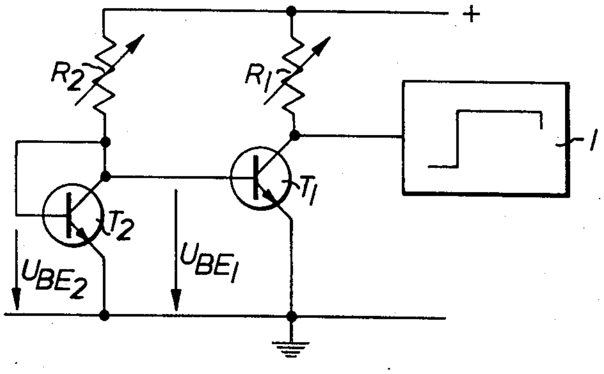
FIG. 2 is a circuit diagram of an alternative form of amplifier in accordance with the invention.

It has already been stated that the characteristics of the diode D must correspond as closely as possible to those of the base-emitter diode of the transistor. This is particularly the case if the diode is replaced by a transistor $T_2$, which is operated as a diode, as shown in FIG. 2. For this purpose, the collector electrode of the transistor $T_2$ is short-circuited by the base electrode. If the two transistors of the amplifier are realized by the integrated circuit teachnique in a semiconductor solid, it is certain that the electrical characteristics of the two transistors will coincide.

Connected to the amplifier, for example, is a threshold switch 1, which varies its switching state when a specific potential is reached at the collector electrode of the transistor $T_1$. This threshold amplifier can be formed by a Schmitt trigger.

It will be understood that the above description of the present invention is susceptible to various modifications, changes and adaptations.

What is claimed is:

1. An amplifier circuit comprising a common-emitter connected transistor, a first resistor connected into the collector path of said transistor and connected to a source of supply voltage and a voltage divider for adjusting the base-emitter direct voltage of said transistor and including a second resistor connected to said source of supply voltage, and a diode connected in series with said second resistor and in parallel with the base-emitter path of said transistor, and wherein said first and second resistors are semiconductor strain gauges, each strain gauge having a variable resistance value which varies oppositely to the resistance value of the other of said strain gauges under the influence of an external load.

2. A circuit as defined in claim 1, wherein said strain gauges have resistances which cause the current flowing through said voltage divider and said collector path of said transistor to be substantially equal when free of external load.

3. An amplifier circuit as defined in claim 2, wherein one of said two strain gauges is extensible lengthwise and the other of said two strain gauges is extensible in the transverse direction under an axternal load.

4. An amplifier circuit as defined in claim 3, further comprising a threshold switch coupled to said transistor.

References Cited

UNITED STATES PATENTS

| | | | |
|---|---|---|---|
| 3,531,655 | 9/1970 | Taylor | 330—38 MX |
| 3,585,511 | 6/1971 | Schatter | 330—38 MX |
| 3,518,886 | 7/1970 | Talmo et al. | 73—88.5 RX |

ROY LAKE, Primary Examiner

L. J. DAHL, Assistant Examiner

U.S. Cl. X.R.

73—88.5 SD; 330—19, 23